Dec. 21, 1926.  
A. M. RITCHEY  
GRADE CROSSING  
Filed Jan. 16, 1923  
1,611,560
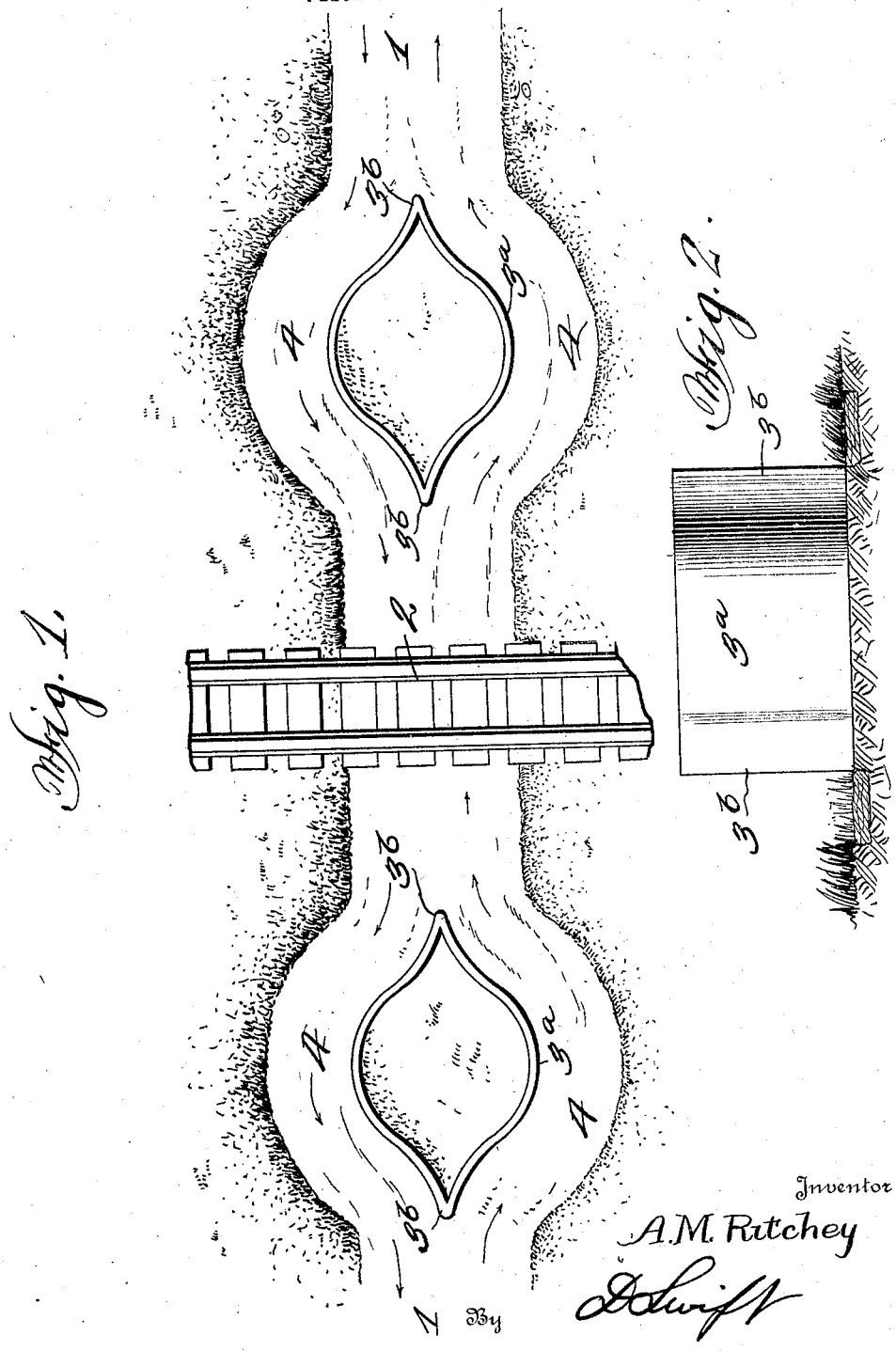
Inventor  
A.M. Ritchey  
By  
Attorney Patented Dec. 21, 1926.

1,611,560

UNITED STATES PATENT OFFICE.

ANDREW M. RITCHEY, OF SAN ANTONIO, TEXAS.

GRADE CROSSING.

Application filed January 16, 1923. Serial No. 613,005.

The invention relates to grade crossings and has for its object to provide barriers at opposite sides of the crossing which barriers comprise wedge shaped members having wedge shaped members at opposite sides thereof on the longitudinal centers of the road, and which wedge shaped members are concaved thereby preventing restricting the roadway adjacent the opposite ends of the barriers.

A further object is to make the barriers of substantially the same width as the roadway and when placed in position will form compound bends in the road at opposite sides of the barrier.

With the above and other objects in view the invention resides in the combination and arrangement of parts as hereinafter set forth shown in the drawings, described and claimed, it being understood that changes in the precise embodiment of the invention may be made within the scope of what is claimed without departing from the spirit of the invention.

In the drawings:—

Figure 1 is a top plan view of a grade crossing and the barriers.

Figure 2 is a side elevation of one of the barriers.

It has been found that a great many accidents are caused at grade crossings by automobiles and vehicles reaching the crossing at a speed which will not allow the operator of the automobile to stop the machine before it reaches the crossing. To obviate this difficulty the road 1 at opposite sides of the track 2 has placed centrally therein a wedge shaped barrier 3ª, which barrier is preferably of substantially the same width as the road 1 and convexed at its opposite sides, and consequently in connection with the arcuate shaped road sections 4 form circuitous passages through which an automobile cannot pass at a high rate of speed. As it is necessary for the automobile to slow down before entering the circuitous passages, therefore the automobile in approaching the railway 2, is at a speed whereby it can be easily controlled and stopped by the operator before crossing the railway 2. If the train is approaching on the track 2, it is obvious that the operator of an automobile can stop his machine and avoid an accident. It will be seen that the road sections 4 have double compound bends therein and consequently an automobile cannot pass through the same at a high speed, and when the automobile passes from one of the road sections 4 it will be under control.

The barriers 3ª are convexed at their opposite sides and are provided with concaved extensions 3ᵇ, which extensions are longitudinally disposed in relation to the road bed 1, and form means for more clearly indicating the division or center of the road bed for right and left hand travel. By concaving the opposite sides of the extension 3ᵇ they will not restrict the width of the roadbed at the points where the vehicle enters the road bed. The barrier 3ª may also be used for advertising purposes, for instance by pasting posters thereon or painting advertising matter directly on the barriers.

From the above it will be seen that means is provided whereby vehicles, such for instance as automobiles approaching crossings or other dangerous points may be compelled to reduce the speed of the automobile before it reaches the point of danger, thereby obviating accidents such for instance as accidents which are common at the present time at grade crossings.

The invention having been set forth what is claimed as new and useful is:—

A roadway barrier, said barrier being centrally disposed within a road way, a second road intersecting the roadway, the opposite sides of the barrier being convexed, said barrier being spaced from the intersection of the roadways, thereby forming circuitous road sections at opposite sides of the barrier, said barrier terminating at opposite ends in wedge shaped portions in registration with the longitudinal center of the road, said wedge shaped portions having their sides concaved concentrically with adjacent portions of the road.

In testimony whereof I have signed my name to this specification.

ANDREW M. RITCHEY.